June 2, 1964  G. S. WING  3,135,486
AIRFOIL CONSTRUCTION AND METHOD FOR MAKING THE SAME
Filed April 19, 1962  3 Sheets-Sheet 1

INVENTOR.
GEORGE S. WING
BY
ATTORNEYS.

June 2, 1964            G. S. WING            3,135,486
AIRFOIL CONSTRUCTION AND METHOD FOR MAKING THE SAME
Filed April 19, 1962            3 Sheets-Sheet 2
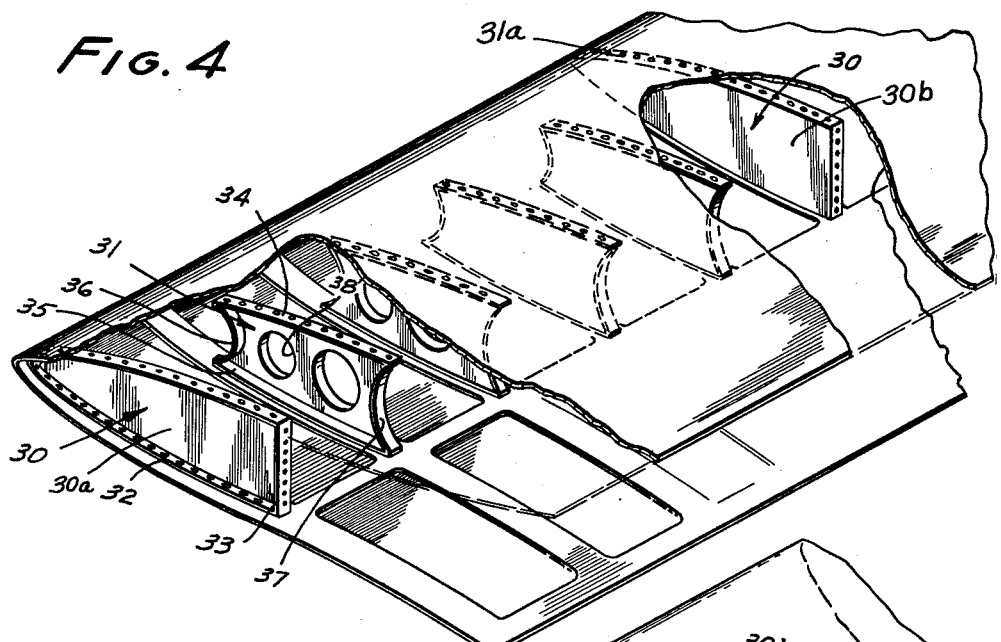
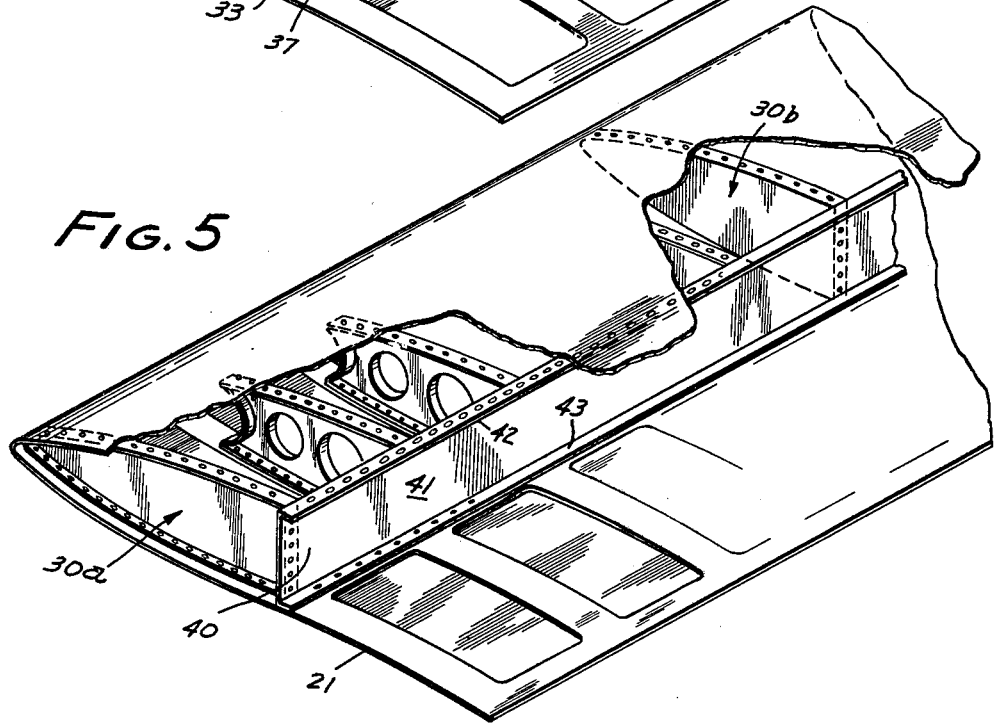
INVENTOR.
GEORGE S. WING
BY
ATTORNEYS.

INVENTOR.
GEORGE S. WING
BY
ATTORNEYS.

United States Patent Office 3,135,486
Patented June 2, 1964

3,135,486
AIRFOIL CONSTRUCTION AND METHOD FOR MAKING THE SAME
George S. Wing, Palos Verdes Estates, Calif., assignor to Kirk-Wing Company, Vega Baja, Puerto Rico, a corporation of Puerto Rico
Filed Apr. 19, 1962, Ser. No. 188,698
4 Claims. (Cl. 244—123)

This invention relates to an aircraft wing, and to a method for making it.

The manufacture and design of aircraft wings have always involved a number of compromises relating to weight, aerodynamic cleanliness, and expense of fabrication. These matters have had to be compromised, because the primary considerations which outweigh all others are the strength and configuration of the wing. Without adequate strength and the proper size and contour, the wing is not functional for its intended purpose. However, when building a wing of the proper size and shape with conventional techniques, it frequently is necessary to add weight, eccentric structures, and joints at places where they are inherently undesirable, but which conventional techniques of design and assembly offer no way of avoiding.

For example, in a typical airfoil, front and rear spars are provided which are joined together by ribs or formers and the skin is then riveted to the spars, ribs and formers. This raises the problem of how to achieve aerodynamic cleanliness on the surface. A conventional technique is to use countersunk rivets, but then the heads must be sunk into the skin. A sink can be provided either by dimpling the sheet adjacent to the rivet holes, or by countersinking the skin to form the holes. Dimpling requires an operation involving costs; it does not provide the cleanest surface, and is leaves a bump on the opposite side of the skin which has to be fitted into another dimple or countersink in adjacent structure. Thus, forming the dimple requires a dimpling operation in the skin itself and a countersinking operation beneath it. Such a fitting is inherently expensive and is often impossible or undesirable to use in many locations, particularly where the material removed from the adjacent structure involves a strength or fatigue disadvantage. When this technique is used, the head of the rivet is sometimes ground flush after being set. This reduces the inherent strength of the rivet, which is also an undesirable situation. On the other hand, if the skin itself is to be countersunk by removing material around the hole, then the skin at the rivet hole must be thick enough to provide hole length for the countersink and also for wall surface to provide adequate bearing surfaces for the rivet shank. As a practical matter, this dictates using a sheet thick enough at all locations to accommodate the rivet configuration, which thickness is greater than it has to be at all but the relatively few locations where the rivets are driven, thereby increasing the weight of the wing by a substantial amount.

Furthermore, conventional assembly techniques have required extensive provisions for access to the interior of the wing in order to complete its assembly. Access holes and plates add to the weight and complexity of a wing and it is desirable to use as few of them as possible.

It is an object of this invention to provide a wing which can readily be assembled with minimal provisions for access during assembly, which minimizes joints of more than two elements, which utilizes skin of maximum thickness only where such thickness is required, and a minimum thickness in other locations, and which is inherently aerodynamically clean.

It is another object of this invention to provide a method for assembling a wing structure which is easier, quicker and less expensive than conventional methods.

An airfoil according to this invention includes a skin formed to an airfoil contour, and which is attached to leading edge formers, trailing edge formers, and a front and a rear spar. According to a preferred but optional feature of the invention, the thickness of the skin is reduced except at those locations contiguous to formers and spars to which the skin is attached.

According to a preferred but optional feature of the invention, the differential thickness of the skin is formed by chemically milling recesses in a surface of the wing between the regions of attachment between the skin and its supporting structure.

According to still another feature of the invention, the wing is constructed by first forming the skin to substantially the desired contour; then chemically milling away some of the skin to form recesses between areas contiguous to supporting structure, then fastening the leading edge formers inside the leading edge of the skin; the fastening the forward spar inside the skin; then fastening the trailing edge formers inside the skin; and finally attaching the rear spar inside the skin.

The above and other features of this invention will be fully understood from the following detailed description and the accompanying drawings in which:

FIGS. 4, 5 and 6 are perspective views, partly in cutaway cross-section, showing succeeding assembly operations;

Figure 1:
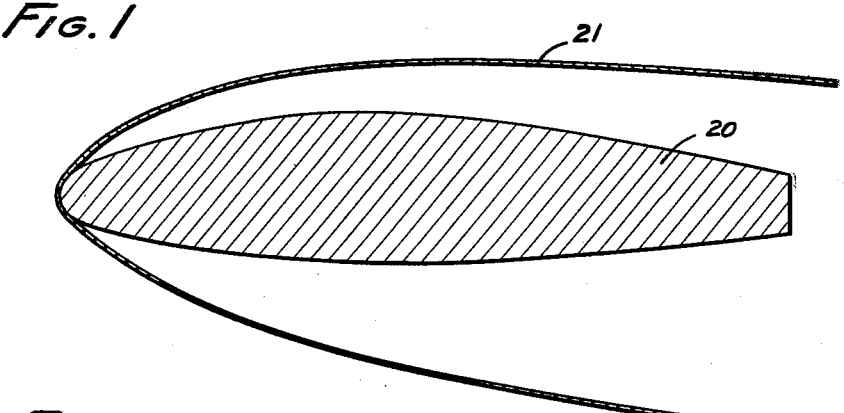
FIG. 1 is a cross-section showing a first forming step in the manufacture of a wing according to the invention.

The wing construction can best be understood from the method of making it. For reference, the wing is shown as having a forward axis F, and a lateral axis L. L is the outboard axis in the aircraft, and F is the axis of forward motion through the air. With initial reference to FIG. 1, there is shown a form 20 having a contour which is substantially congruent to that of the inside dimensions of a sheet 21 whose outer surface would have the desired airfoil configuration. Thus, the contour of the form plus the thickness of the skin results in the desired outer airfoil configuration. The skin is shown being rolled or drawn over the form to be permanently set to the desired contour 22.

Figure 2:
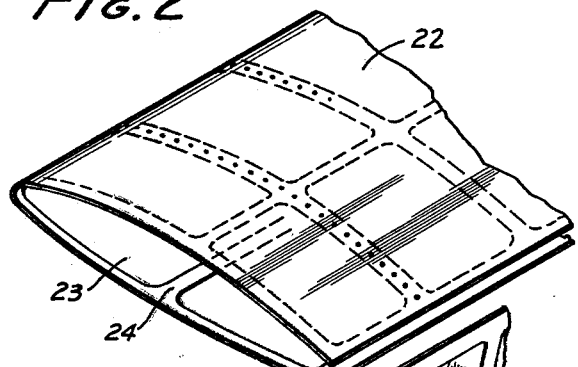
FIG. 2 is a perspective view of an intermediate configuration of part of the structure.
Figure 3:
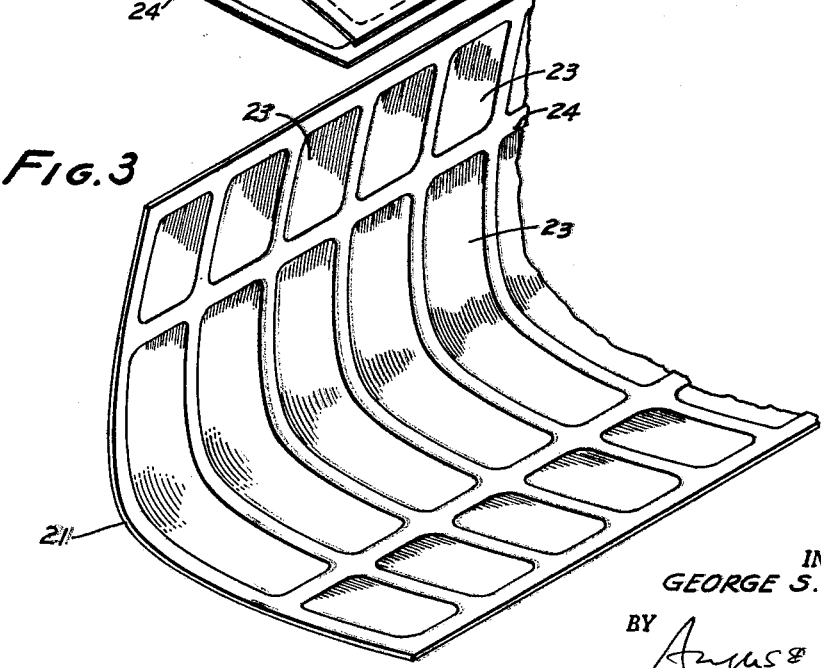
FIG. 3 is a view of the structure of FIG. 2, partially opened for purposes of illustration.
Figure 8:
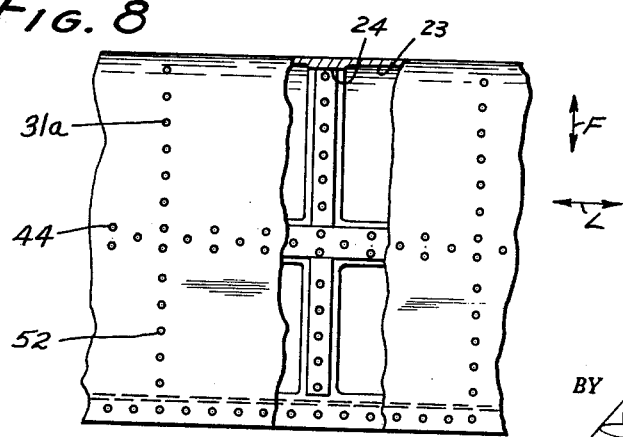
FIG. 8 is a fragmentary top view, partly in cutaway cross-section, of a completed wing.

The next step in the manufacture of the wing it to form the inside surface of sheet 21 to the condition in FIGS. 2 and 3. A plurality of spaced-apart recesses 23, which are interspersed by a grid 24 of thicker material is desired. FIG. 8 shows the difference in thickness of the skin at the recesses and at the grid. This group of recesses is formed by the chemical milling process. In this process, the grid areas are masked, and the areas where the recesses are to be formed are left unmasked, and then the sheet is placed in a material-removing solution until the desired amount of material has been removed. The sheet is then rinsed and dried. It then has the contour on its inside surface which is shown in FIG. 2. The sheet is shown opened up in FIG. 3 for purposes of illustration.

There are no points of discontinuity between the grids and the recesses, and all portions of the skin are formed integrally. Countersunk rivet holes 25 can be drilled before the forming operation (particularly when the sheet is rolled to the desired shape rather than stretched) in the areas where the grids are to exist. All drilling operations can then be performed on a flat sheet before any forming or material-removing operation, and the skin is therefore adapted for assembly as soon as the recesses are formed. Alternatively, the sheet can first be formed to shape and then drilled. It will be noted that there are no separate attachments needed at the grid areas to provide hole depth for both the rivet head and shank, because the skin material includes a sufficient thickness in the grid area to accommodate a countersunk rivet. The skin at the recesses has no more thickness than is needed for the stresses to be resisted by the skin itself.

The next operation is to build in bulkheads 30 and leading edge formers 31. The bulkheads and formers 31 will sometimes collectively be referred to as leading edge formers. The sole important difference between them is that the bulkheads are solid and imperforate and enable the leading edge of the wing to be used as a tank, while the formers have holes therethrough to provide for fluid flow and for minimal weight of structure. For example, bulkheads 30 include peripheral flanges 32, 33, flanges 32 being adapted to be riveted to the skin at the grid areas. As will later be seen, flanges 33 are to be riveted to a spar. The flanges on inboard bulkhead 30a face inboard, and those on outboard bulkhead 30b face outboard.

Leading edge formers 31 include flanges 34, 35, which are adapted to be attached to the skin at the grids. Formers 31 have relief flanges 36, 37 at their forward and rear ends with lightening holes 38 in the middle.

Bulkheads are placed wherever it is desired to provide fluid-impermeable barriers. Leading edge formers are placed wherever else inside support for the skin is considered necessary.

In order to assemble the bulkheads and leading edge formers with the skin, they are placed inside the fold formed by the skin, and rivets 31a are driven to connect the leading edge of the skin and flanges 32, 34 and 35. These flanges may be predrilled to match holes in the skin. There is easy access for bucking these rivets, because the skin can be peeled back as shown in FIG. 4 while the formers are riveted. The bucking bar can readily be inserted in the fold of the skin between the formers and bulkheads. Access is available to both sides of the structure where the bulkheads are located. The flanges face outboard of the tank space defined between them. Therefore, no access holes are required for assembly of the tank section. Full lines of rivets and holes for rivets are not shown in the drawings, for the sake of clarity. It is evident that rivets are driven along all of the joints indicated herein, in accordance with common shop practice.

The next operation is the fastening in of a front spar 40 (FIG. 5). The spar includes a central shear web 41 and a pair of flanges 42, 43, which extend from the same side of the shear web, and form a U-shaped cross-section. The bulkheads are riveted to the spar by rivets passed through flanges 33, and through holes in the spar. The leading edge formers 31 are not attached to the spar.

Figure 6:
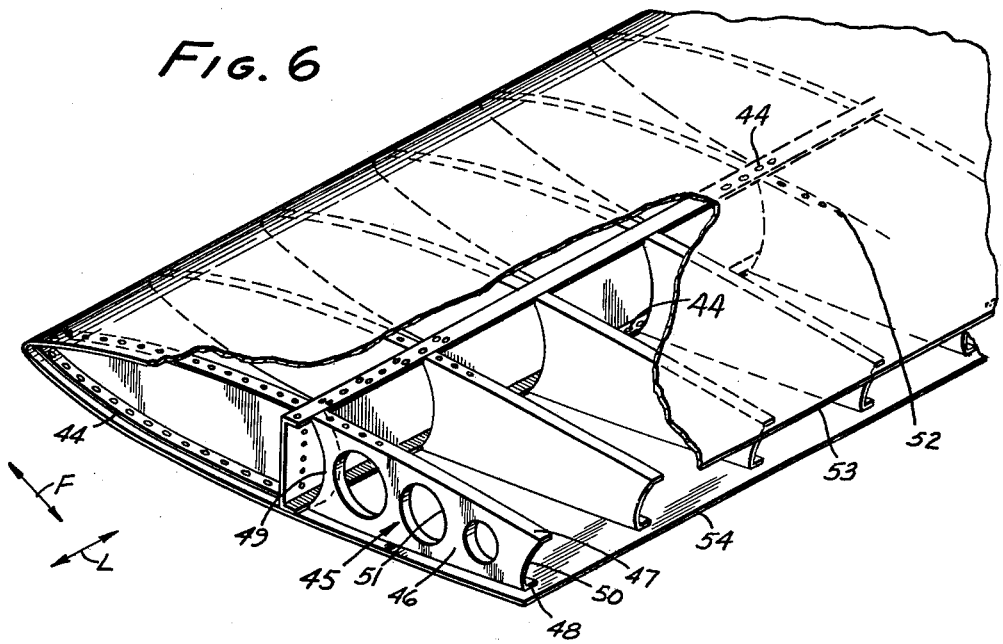
Figure 7:
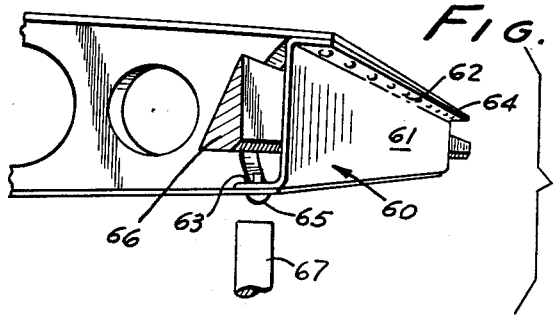
FIG. 7 is a perspective view showing the skin close-out operation.

Next, rivets 44 are driven to attach flanges 42 and 43 to the skin (FIG. 6).

The next step in the process is the attachment of the skin to trailing edge formers 45, which formers include central webs 46 and flanges 47, 48. The webs also include recessed portions 49, 50 at each end, and lightening holes 51. The skin is laid against flanges 47 and 48, and rivets 52 are driven to attach them. A bucking bar can readily be passed through the opening between the edges 53, 54 of the skin.

The last step in the assembly process is the attachment of the rear spar, which accomplishes the closing out of the wing. Rear spar 60 includes a shear web 61 and a pair of flanges 62, 63, which extend on opposite sides of the web to give the spar substantially a Z-shaped cross-section. Flange 62 is readily attached to the skin by rivets 64, at an edge which is entirely in the open for riveting operations. Flange 63 is enclosed, but rivets 65 are reached for bucking by passing a bucking bar 66 through the passage formed by recessed portions 50 and by shear web 61. The rivets are driven by a rivet gun 67, and are backed up by the bucking bar. This completes the skin close-out and the wing structure itself.

The resulting structure is shown in FIG. 8, where it will be seen that, because of the formation of the recesses, adequate thickness of integral material exists at the grid for the countersink head of the rivet plus sufficient hole wall for bearing of the rivet shank at the places where the rivets are attached. However, the thickness is reduced at the recesses to only that dimension which is required by strength considerations. It will be observed that no separate attachments are needed which might result in eccentric loads or create a joint subject to excessive fatigue. Instead, at every point, the skin is an integral structure, and the only joints are two member attachments by rivets, which are tight and fatigue resistant.

Furthermore, as can be seen from the aforesaid, the elimination of extra weight in the thickness of the skin plus the elimination of extra means of attachment and the minimizing of excess access holes, results in a wing of greatly improved properties and of minimum weight for its strength requirements.

Furthermore, forming the skin before removing the recess chemically, reduces the strains and wrinkling tendencies inherent in the usual means for attaching skin to formers and spars, and results in an aerodynamically clean optimum wing structure which is particularly well suited for light aircraft.

This invention is not to be limited by the embodiment shown in the drawings and described in the description which is given by way of example and not of limitation, but only in accordance with the scope of the appended claims.

I claim:

1. An airfoil structure having a forward and a lateral axis comprising: a skin having an airfoil contour, a grid of areas of a first thickness and a plurality of recesses in a surface thereof disposed within the grids where the skin is of lesser thickness; a front spar comprising a central shear web, and a pair of integral flanges on the same side of the web, these flanges being directed rearwardly along said forward axis; a rear spar comprising a central shear web and a pair of integral flanges, one on each side of the web, said spars being spaced apart from each other along the forward axis, and being attached to the skin at portions of the said grid; a plurality of forwardly-extending leading edge formers disposed forward of the forward spar and fastened to the skin at portions of said grid; each of said formers having lateral peripheries at least portions of which support the skin in its contour; a plurality of forwardly-extending trailing edge formers disposed between the spars, said trailing edge formers having webs and flanges which are attached to the skin at portions of the grids to support the skin in its contour, the skin forming the top, bottom and leading edge of the airfoil being formed from a single, continuous sheet of skin, the trailing edges thereof being joined by the rear spar.

2. An airfoil structure according to claim 1 in which each of the trailing edge formers includes a recessed portion adjacent to one of the flanges on the rear spar.

3. An airfoil structure according to claim 2 in which the recessed portions in the trailing edge formers are adjacent to a flange on the rear spar which lies on the forward side of the spar, whereby the recessed portions form a passage for admitting a bucking bar for use in driving rivets which attach the skin to that flange.

4. A method for fabricating an airfoil structure comprised of a front spar having a U-shaped cross-section, a rear spar having a Z-shaped cross-section, a plurality of leading edge formers, a plurality of trailing edge formers each having a recessed portion, and a skin, comprising the following steps: (a) forming the skin to a folded configuration whose outer surface has an airfoil contour; (b) chemically milling the inner surface of the skin to form a grid of first thickness and a plurality of recesses within the grid where the skin is of lesser thickness; (c) riveting the leading edge formers to the grid; (d) riveting the front spar to the grid, with its U-shaped cross-section opening away from the leading edge formers; (e) riveting the trailing edge formers to the grid, with the recessed portions at the opposite end of the trailing edge formers from the front spar; (f) riveting one arm of the Z-shaped cross-section of the rear spar to the skin; (g) passing a bucking bar through the recessed portions; and (h) riveting the other arm of the rear spar to the skin.

References Cited in the file of this patent

UNITED STATES PATENTS

| | | |
|---|---|---|
| 2,567,124 | Roberts | Sept. 4, 1951 |
| 2,615,234 | Dumbleton | Oct. 28, 1952 |
| 2,739,047 | Sanz | Mar. 20, 1956 |